United States Patent

Byatt et al.

Patent Number: 6,073,488
Date of Patent: Jun. 13, 2000

[54] CAPACITIVE LIQUID LEVEL SENSOR WITH INTEGRATED POLLUTANT FILM DETECTION

[75] Inventors: Anghony Byatt, Klingnau; Thomas Christen, Vogelsang; Thomas Kleiner, Rieden-Nussbaumen; Daniel Matter, Brugg; Walter Rüegg, Endingen, all of Switzerland

[73] Assignee: ABB Research Ltd., Zurich, Switzerland

[21] Appl. No.: 09/208,500

[22] Filed: Dec. 10, 1998

[30] Foreign Application Priority Data

Dec. 22, 1997 [DE] Germany .......................... 197 57 190

[51] Int. Cl.$^7$ .................................................. G01F 23/26
[52] U.S. Cl. ........................................ 73/304 C; 73/290 R
[58] Field of Search .............................. 73/304 C, 304 R, 73/290 R, 64.55; 340/620; 361/284; 307/652

[56] References Cited

U.S. PATENT DOCUMENTS

| | | |
|---|---|---|
| 3,644,821 | 2/1972 | Long . |
| 4,795,967 | 1/1989 | Fredericks .............................. 324/61 P |
| 4,806,847 | 2/1989 | Atherton et al. ...................... 73/304 C |
| 5,477,727 | 12/1995 | Koga ..................................... 73/304 C |
| 5,611,240 | 3/1997 | Yamaguchi ............................ 73/304 C |
| 5,739,598 | 4/1998 | Zatler et al. ............................ 307/652 |

FOREIGN PATENT DOCUMENTS

| | | |
|---|---|---|
| 0029485 | 6/1981 | European Pat. Off. . |
| 2340845 | 8/1974 | Germany . |
| 2645716C2 | 4/1978 | Germany . |
| 2819731 | 12/1979 | Germany . |
| 3237594A1 | 4/1984 | Germany . |
| 249966A1 | 9/1987 | Germany . |
| 3812687A1 | 10/1989 | Germany . |
| 29505689 U1 | 9/1995 | Germany . |
| WO95/04261 | 2/1995 | WIPO . |

Primary Examiner—Hezron Williams
Assistant Examiner—Michael Cygan
Attorney, Agent, or Firm—Burns, Doane, Swecker & Mathis, L.L.P.

[57] ABSTRACT

The subject matter of the present invention is a method and a device for capacitive liquid level measurement which are particularly suitable for determining liquid level between adhesive media 10, 11 of different conductivity. The known sensor principle is based on the fact that the environmentally dependent capacitance is measured between neighboring electrodes 13, 4; 4, 5; 5, 6 of a rod-shaped probe 1. According to the invention, the probe 1 has electrodes 4, 5, 6, 13 with covers 7 of different thicknesses $d_i$. The effective thickness $d_s/\epsilon_s$ of an insulating pollutant film 14 can then be determined by capacitance measurements between at least two pairs of electrodes 4, 5, 6, 13. The influence of a conductive pollutant film 14 on the capacitance signal can be eliminated by selection of at least one suitable measuring frequency. Furthermore, by optimizing the electrode height h, a large capacitance jump is achieved for a digital liquid level display, and/or a largely continuous increase in capacitance is achieved for an analog liquid level display. The sensor is preferably used to determine the location of an interface 12 between water 10 and oil 11 in a separator tank.

21 Claims, 7 Drawing Sheets

CAPACITIVE LIQUID LEVEL SENSOR WITH INTEGRATED POLLUTANT FILM DETECTION

BACKGROUND OF THE INVENTION

1. Field of the invention

The invention relates to the field of liquid level displays. It proceeds from a method for liquid level measurement and a capacitive liquid level sensor according to the preambles of claims 1 and 4.

2. Discussion of Background

There are known in the prior art a multiplicity of devices for determining the liquid level in a container which are based on very different physical measurement principles. These comprise electrical (capacitive or resistive) and optical methods, radar reflection methods, ultrasonic echo time methods and gamma-ray absorption methods.

Use is made in offshore petroleum recovery of so-called separation tanks, in which the different phases (sand, water, oil and gas) occurring during drilling or recovery are separated on the basis of their density differences and led off in separate conduit systems. It is very important in this regard to know the height of the separating layer between the water and oil, in order to be able to open and close the outlet valves for the two media on the tank in a controlled fashion. Reliable liquid level measuring instruments are required for this purpose. If such a liquid level measuring instrument does not function or functions incorrectly, it is possible, for example, for oil to reach the water outlet and cause considerable environmental damage and costs.

Recently, high-pressure separation tanks have been developed which are suitable for operation on the sea bed a few 100 m below the surface of the sea. The oil, recovered and already separated, can then be pumped to the surface of the sea with a much lesser expenditure of energy. Such separator tanks are exposed to very high pressures of 60 bars–180 bars, and to high temperatures of 50–120° C. The liquid level measuring system must function all year round without maintenance and reliably under these difficult conditions, since an operational failure and premature replacement would entail high costs.

In an earlier German patent application (reference number 197 13 267.7) which is not a prior publication, there is proposed as a solution to this problem a capacitive measuring probe which makes use, in particular, of the large jump between the dielectric constants at the interface between oil and water. The rod-shaped, inherently closed probe carries a plurality of annular or toroidal electrodes, partially segmented in the longitudinal direction, along the axis. The stray capacitance between neighboring electrodes varies with the dielectric constants of the ambient medium. The capacitance signals of the electrode pairs can be used individually for a digital liquid level display, or averaged for an analog liquid level display. In both cases, the spatio resolution is limited by the periodicity of the electrode arrangement. Liquid levels situated therebetween cannot be measured. Another disadvantage is that interfaces between media of the same dielectric constant cannot be detected. As an alternative, or in addition, it is proposed for media of different conductivity to measure the ohmic discharging currents of electrode pair capacitances in order to locate the interface. This requires a measuring frequency to be selected so low that the ohmic current dominates over the capacitive one in both media. However, no account is taken of effects of the conductivity of the media on the geometry and size of the effectively active electrode pair capacitances.

Pollution of the measuring probe by the media to be measured constitutes a considerable problem for the measuring accuracy and reliability of such liquid level sensors. For example, a conductive water film can complicate or preclude the detection of an oil medium, and a nonconducting oil coating can complicate or preclude the detection of a water medium. In the abovenamed patent application, it is proposed to design the probe specifically for close-range and long-range measurements: the stray capacitances are a measure for the close range of the measuring probe when the electrodes are of large area and/or widely spaced, and are a measure for the close range when the electrodes are of small area and/or closely spaced. However, it is disadvantageous that the optimum electrode geometry is specified only with regard to the range of the stray fields in the dielectric media and, moreover, only qualitatively. Finally, the long range can also be effectively detected by capacitance measurements between the probe and an additional counter electrode, for example the container wall. Furthermore, the close range can be measured in conductive media using the skin effect. However, very high frequencies are required for penetration depths in the mm region –10 GHz and above, for example, in the case of water.

DE 28 19 731 discloses a capacitive sensor which serves to monitor the limiting value of an adhesive, conductive medium. The capacitance measurement is performed between a rod-shaped probe and the container wall. Conductive deposits on the probe and the wall can cause fault currents which are detected by a shielding electrode along the probe axis. The fault currents can also be kept low by measuring frequencies which are as high as possible. A disadvantage of this arrangement consists in that the liquid level height cannot be measured continuously.

DE 38 12 687 A1 discloses a capacitive sensor whilst simultaneously determining the level and the water content of an at least weakly conductive liquid. For this purpose, two coaxially arranged electrodes are dipped into the medium and the complex impedance is measured at at least two frequencies. The capacitive reactance is a measure of the liquid level, and the ohmic effective resistance is a measure of the conductivity of the medium.

None of the said sensors takes account of the fact that the measurement of capacitance in conductive media is influenced by ionic charge transport, something which gives rise to new possibilities for eliminating the disturbing influences of insulating and conductive pollutant films. Moreover, new conditions can be specified for optimizing the electrode geometry.

SUMMARY OF THE INVENTION

Accordingly, one object of the invention is to provide a novel method for liquid level measurement and a capacitive liquid level sensor which are distinguished by a reduced vulnerability in the event of pollution. This object is achieved according to the invention by the features of claims 1 and 4.

Specifically, the core of the invention is to determine an effective thickness of an insulating pollutant film with the aid of capacitance measurements between electrodes which are arranged along a rod-shaped probe and are provided with electrically insulating coverings of different thickness.

A first exemplary embodiment exhibits a method in which a quotient of double-layer capacitances of two electrodes is determined from capacitance measurements, a pollutant film thickness is calculated and, if appropriate, the influence of the latter on the capacitance signal is eliminated. In this case, a measuring probe is exhibited in which different thicknesses of cover are realized by radial offsetting of the electrodes.

A second exemplary embodiment shows how it is possible, using suitable measuring frequencies, for conductive pollutant films to be detected on the probe, and for their influence on the capacitance signal to be eliminated.

A third exemplary embodiment exhibits a measuring probe in which a capacitance between neighboring electrodes is selected to be large for conductive media and to be small for insulating media by optimizing the electrode height.

A fourth exemplary embodiment constitutes a variant in which the electrode height is selected to be as large as possible, in order to realize a largely continuous measuring range.

Additional exemplary embodiments follow from the dependent claims and from combinations of features essential to the invention.

Important advantages of the inventive capacitive liquid level sensor relate to the improved reliability in the case of the determination of the liquid level of adhesive media, the high measuring accuracy over a wide measuring range, and the possibility of a digital or analog liquid level display.

A further significant advantage consists in that all the measures which minimize the disturbing influences due to insulating and conductive pollutant films and which maximize the capacitance signals and the measuring range are effectively compatible with one another.

Also advantageous are the simple, robust design without moving parts, the extensive freedom from maintenance and the excellent suitability of the measuring probe for detecting an interface between water and oil.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1A:
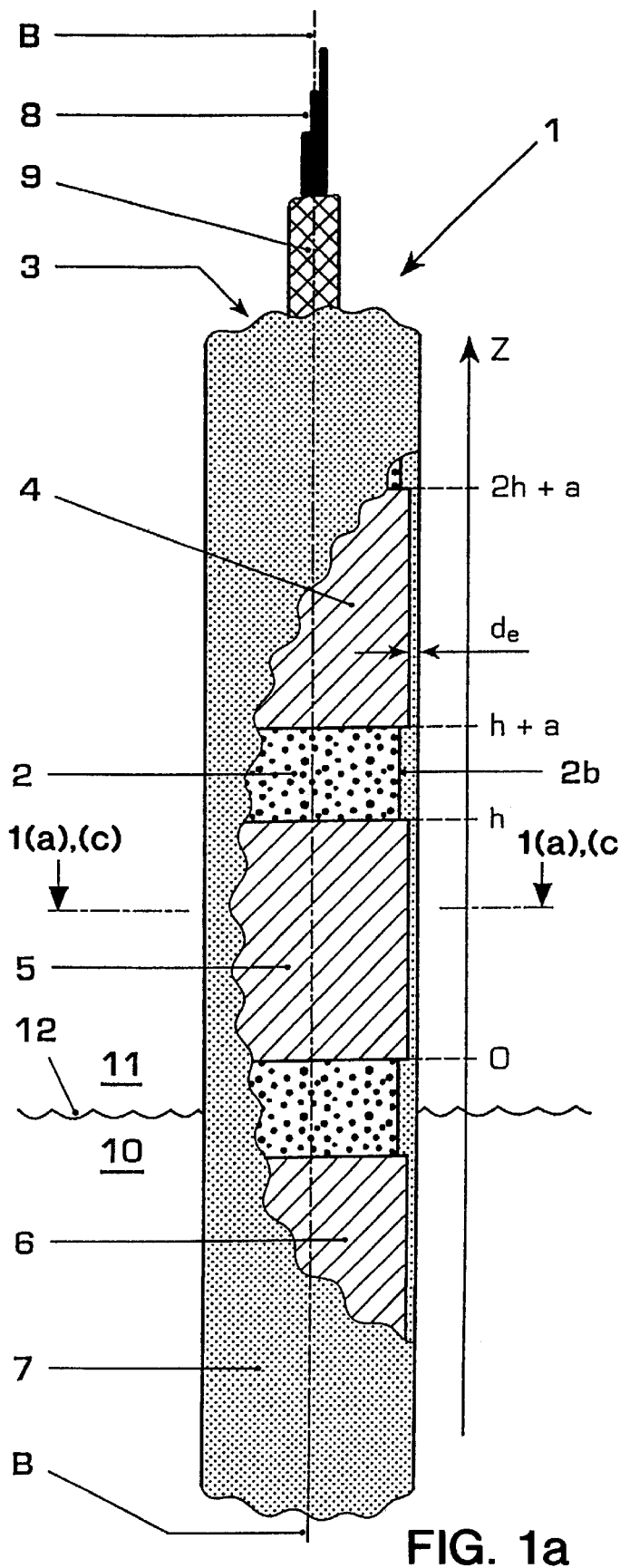
FIG. 1 shows a capacitive measuring probe with a plurality of electrodes arranged one above another, and with a round or square cross section.
Figure 1B:
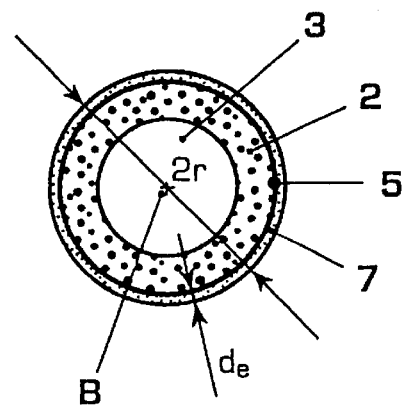
Figure 1C:
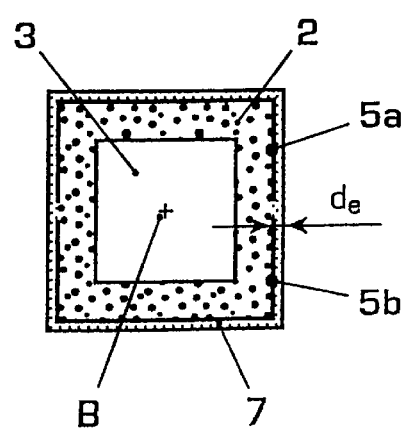

Referring now to the drawings, wherein like reference numerals designate identical or corresponding parts throughout the several views, FIG. 1 shows in a detail (a) a side view of a liquid level sensor according to the invention, and (b), (c) show exemplary embodiments for a round and a square sensor cross section. The capacitive liquid level sensor comprises a rod-shaped probe 1 with a plurality of electrodes 4, 5, 6, 13 which are arranged along a probe axis B and are connected via measuring lines 8 to an electronic measuring system (not represented). The principle of the mode of operation is based on measuring between neighboring electrodes 13, 4; 4, 5; 5, 6 the change in capacitance which is caused by a displacement of an interface 12 between a conductive medium 10 and an isolating one 11. In accordance with FIG. 1a, the measuring probe 1 essentially comprises a cylindrical, electrically insulating tube 2 on whose outer lateral surface 2b the electrodes 4, 5, 6, 13 are applied. The tube interior 3 is sealed against the exterior surrounding the probe 1. The electrodes 4, 5, 6, 13 are preferably provided with an electrically insulating, thin cover 7 which protects the electrodes 4, 5, 6, 13 against mechanical and/or chemical environmental influences. The probe 1 can have any desired cross section. The tube 2 is preferably a circular cylindrical one, and the electrodes 4, 5, 6, 13 are preferably annular (FIG. 1b). It is also possible for segmented (FIG. 1c) electrodes 5a, 5b to be joined to form a single electrode 5.

For the purpose of analyzing the electrode geometry and for its configuration to detect disturbing pollutant films, the invention proceeds from the essential finding that the jump in the conductivity at the interface 12 first and foremost alters the field line distribution of the participating capacitances and thus the total capacitance between neighboring electrodes, that is to say the electrode pair capacitance C.

Figure 2:
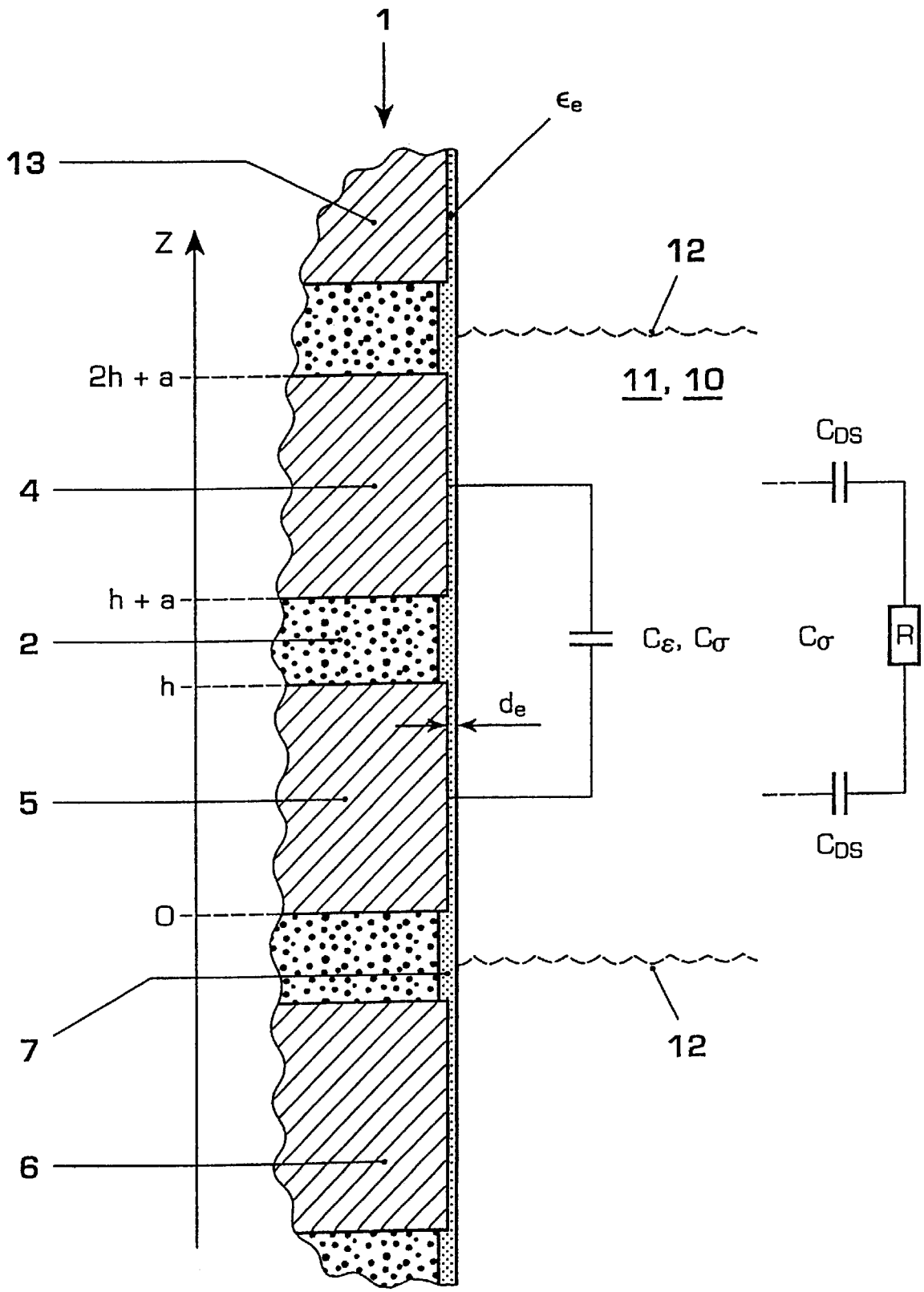
FIG. 2 shows a view of a detail of a pollution-free measuring probe in accordance with FIG. 1 with equivalent circuit diagrams for the impedance between an electrode pair.

FIG. 2 represents a view of a detail of the measuring probe 1, including an equivalent circuit diagram, modeled in accordance with the invention, for the complex total capacitance between the electrodes 4 and 5. Dominant in the insulating medium 11 is the stray capacitance $C_\epsilon$, which is given by the geometry of the electrodes 4, 5 and the dielectric constant of the medium 11 and of the rod material, and is calculated in the concrete case using a finite element program. By contrast, a simple analytical representation is possible in a conductive medium 10. In the immediate neighborhood of the electrodes 4, 5, charge carriers are induced and very large double-layer capacitances $C_{DS}$ are formed which are interconnected via the resistance R of the medium 10 and form a complex total capacitance $$C_o = C_{DS}/[2 \cdot (1 + i \cdot \omega \cdot \tau)] \tag{G1}$$

Here, i=imaginary unit, $\omega = 2\pi \cdot f$, f=frequency of the capacitance measurement and $\tau$=RC time constant of the double-layer capacitance or dielectric relaxation time of the RC circuit.

The double-layer capacitance is $$C_{DS} = \epsilon_e \cdot \epsilon_0 \cdot A/d_e, \tag{G2}$$

it being the case that $\epsilon_e$=dielectric constant and $d_e$=thickness of the dielectric electrode cover 7, $\epsilon_0$=absolute permittivity, and A=double-layer capacitor surface=surface of the associated electrode (4, 5, 6, 13 including cover 7). $C_{DS}$ is therefore given by the effective thickness $d_e/\epsilon_e$ of the electrode cover 7 and the surface of the electrode 4, 5, 6, 13, but is independent of the dielectric constants of the conductive medium 10.

The dielectric relaxation time $\tau$ is a measure of the rate at which the double-layer capacitance is charged or formed. It is possible to write $\tau$ in the form of $$\tau = R \cdot C_{DS}/2 = \tau_0 \cdot K = \epsilon_c \cdot \epsilon_0 \cdot \rho_M \cdot K \qquad (G3)$$

where $$K = (A/A_I) \cdot (h/d_c), \qquad (G3')$$

it being the case that $\rho_M$=resistivity of the medium 10, K=dimensionless geometry factor, $A_I$=effective current-carrying surface, and h=electrode height. Typical values of the geometry factor are 1<K<100.

One aim of the invention is to ensure reliable capacitance measurement or determination of liquid level even in the presence of an electrically insulating or conductive pollutant film 14 on the rod surface 15.

Figure 3A:
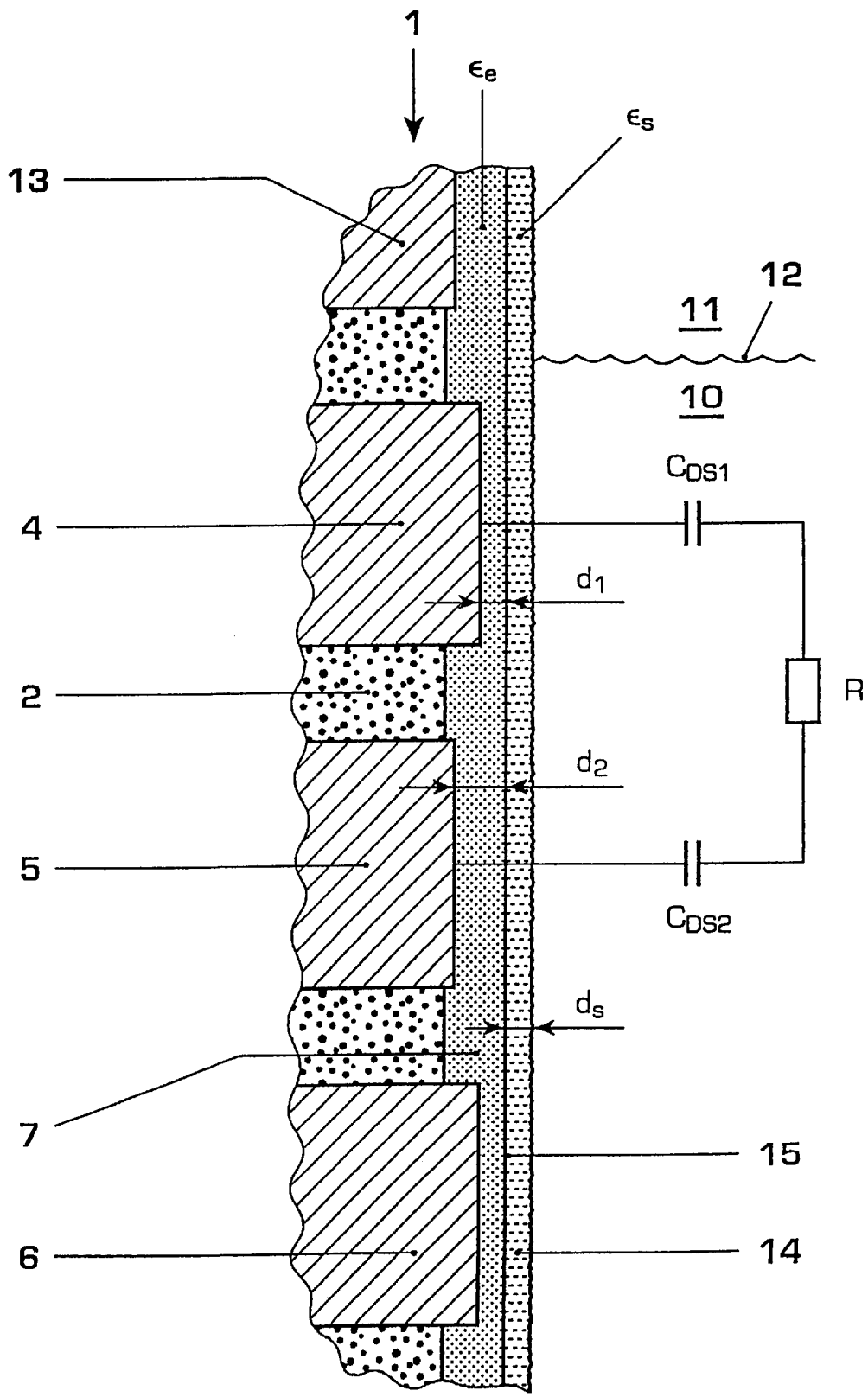
FIG. 3 shows a view of a detail of a measuring probe with electrodes, which (a) alternate and (b) are arbitrarily radially offset, for detecting an insulating pollutant film, and an associated equivalent circuit diagram for the impedance between an electrode pair.

FIG. 3 shows an exemplary embodiment of an electrode arrangement 4, 5, 6, 13, which is particularly suitable for capacitive liquid level measurement in the presence of an insulating pollutant film 14, for example composed of oil. The inventive idea consists in that the probe 1 has electrodes 4, 5, 6, 13 with covers 7 of different thicknesses $d_i$, and the electronic measuring system has means for measuring capacitance between a plurality of electrodes 4, 5, 6, 13, for determining a quotient of double-layer capacitances $C_{DSj}$ and $C_{DSi}$ of the i-th and j-th electrode, and for calculating an effective thickness $d_s/\epsilon_s$ of an insulating pollutant film (14).

In the following, let the electrodes 4, 5, 6 be designated as the i-th, j-th and k-th electrode with the associated cover thicknesses of $d_i$, $d_j$ and $d_k$ and capacitor surfaces of $A_i$, $A_j$ and $A_k$, it being the case that i, j, k=1, 2, . . . , n are indices for enumerating the electrodes, and n is the total number of the electrodes 4, 5, 6, 13. In a conductive medium 10, in the case of $d_i \neq d_j$, different double-layer capacitances $C_{DSi} \neq C_{DSj}$ of the i-th and j-th electrode 4, 5 occur which vary at different intensity with the effective thickness $d_s/\epsilon_s$ of the insulating pollutant film 14, it being the case that $d_s$=geometrical thickness and $\epsilon$=dielectric constant of the film 14. Specifically, by analogy with equation G2, it holds for the values of the double-layer capacitances which are falsified by the film 14 that $$C_{DSi} = \epsilon_0 \cdot A_i / (d_i/\epsilon_e + d_s/\epsilon_s), \qquad (G4)$$

$$C_{DSj} = \epsilon_0 \cdot A_j / (d_j/\epsilon_e + d_s/\epsilon_s). \qquad (G5)$$

According to the invention, the effective thickness of the film 14

$$d_s/\epsilon_s = (d_i/\epsilon_e) \cdot [(C_{DSj} \cdot d_j \cdot A_i)/(C_{DSi} \cdot d_i \cdot A_j) - 1]/[1 - C_{DSj} \cdot A_i/C_{DSi} \cdot A_j] \quad (G6)$$

can be determined therefrom, and for equal capacitor surfaces $A_i = A_j = A$ this simplifies to yield $$d_s/\epsilon_s = (d_i/\epsilon_e) \cdot [(C_{DSj} \cdot d_j)/(C_{DSi} \cdot d_i) - 1]/[1 - C_{DSj}/C_{DSi}]. \qquad (G7)$$

The quotient of the double-layer capacitances $CDS_j/CDS_i$ in equation G6 or G7 can be determined by capacitance measurements between a plurality of electrodes 4, 5, 6, 13. It is advantageous for neighboring electrodes 13, 4; 4, 5; 5, 6 to have different thicknesses $d_i \neq d_j$ (j=i+1) and for electrodes 13, 5 and 4, 6 neighboring in a next but one fashion to have the same thickness $d_i = d_k$ (k=i+2) as the cover 7. In this case, the capacitance values, measured in the presence of the film 14, between electrodes 4, 6 and 13, 5 which are neighboring in a next but one fashion are equal to $C_{oi} = C_{DSi}/2$ and $C_{oj} = C_{DSj}/2$ for low frequencies, and it holds that $$C_{DSj}/C_{DSi} = C_{oj}/C_{oi}. \qquad (G8)$$

The minimum detectable effective thickness $(d_s/\epsilon_s)_{min}$ is given by the relative measuring inaccuracy $\Delta$ in the determination of the quotient $C_{DSj}/C_{DSi}$:

$$(d_s/\epsilon_s)_{min} = (d_i \cdot d_j)/(ld_i - d_j l \cdot \epsilon_s) \cdot \Delta. \qquad (G9)$$

Let $d_i$=0.5 mm, $d_j$=1 mm, $\epsilon_c = \epsilon_s$ and $\Delta$=10% be assumed as an example. In this case, the minimum detectable geometrical thickness of the insulating pollutant film 14 is $d_s$=0.05 mm.

Figure 3B:
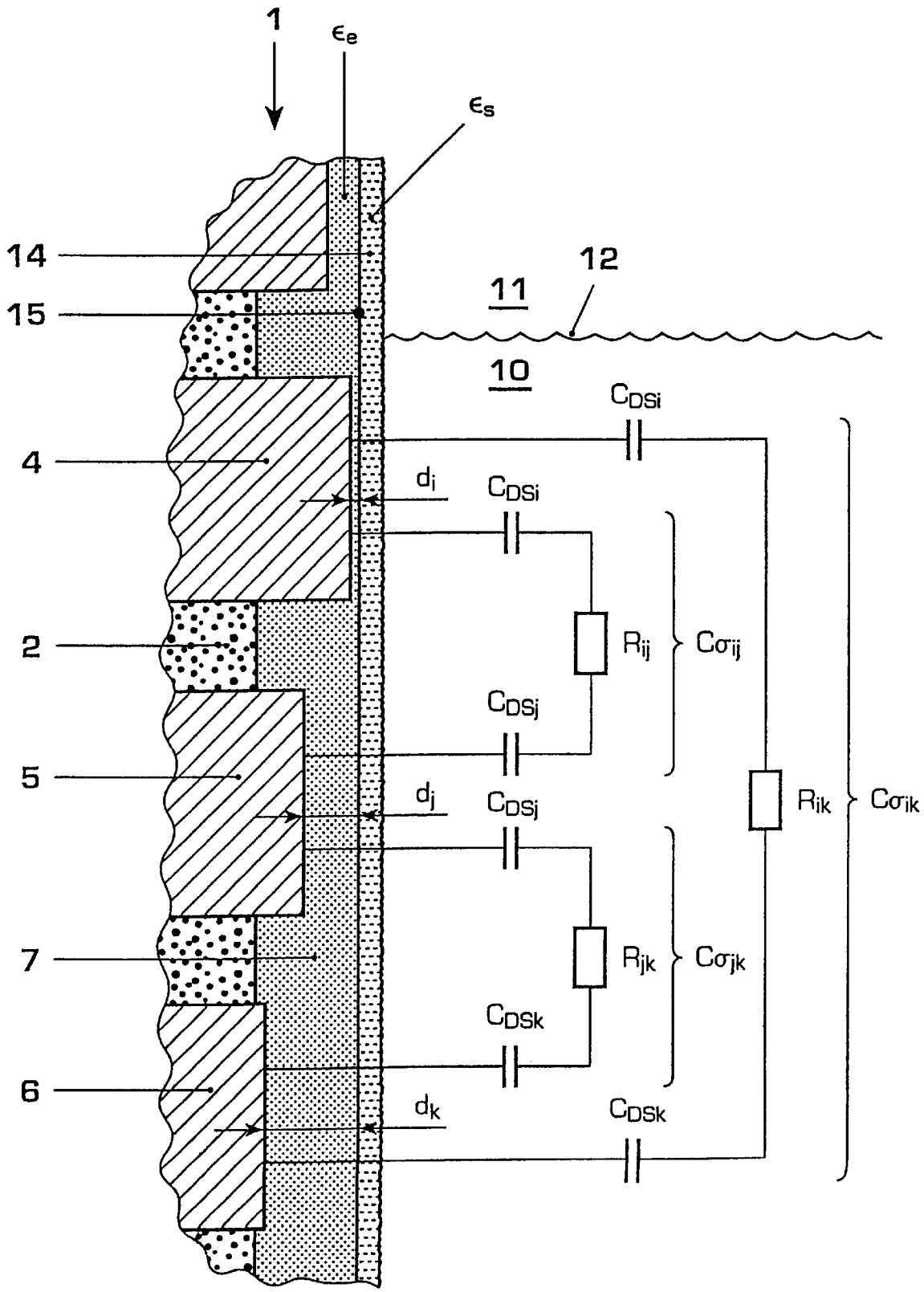

FIG. 3b shows a general case of different cover thicknesses $d_i \neq d_j \neq d_k$ over the electrodes 4, 5, 6. It then holds that $$C_{DSj}/C_{DSi} = (C_{oij}^{-1} + C_{oik}^{-1} - C_{ojk}^{-1})/(C_{oij}^{-1} + C_{oik}^{-1} - C_{oik}^{-1}), \qquad (G10)$$

it being the case that $C_{oij} = (C_{DSi}^{-1} + C_{DSj}^{-1})^{-1}$ etc. denote the total capacitances which can be measured, possibly in a frequency-selective fashion, between the i-th and j-th etc. electrode, that is to say the $C_{oij}$, $C_{oik}$, $C_{ojk}$ denote the total capacitances which are measured between the i-th and j-th, j-th and k-th, i-th and k-th electrodes.

Thicknesses $d_i$ of the cover 7 can thus be selected arbitrarily to the extent that neighboring electrodes 13, 4; 4, 5; 5, 6, that is to say ones belonging to an electrode pair capacitance C, have different thicknesses $d_i \neq d_{i+1}$. Different thicknesses $d_i \neq d_{i+1}$ can also be realized for electrodes 4, 5, 6, 13 of the same cross section, in particular the same radius, by the surface 15 of the probe 1 having step-shaped, in particular annular, elevations of different step heights over neighboring electrodes 13, 4; 4, 5; 5, 6. The corresponding values of the associated capacitor surfaces $A_i$ and $A_j$ are then to be inserted in equations G4–G6. As may be seen from FIG. 3a, it is preferable for the surface 15 of the probe 1 to be a circular cylindrical one, for the electrode 4, 5, 6, 13 to be annular, for their capacitor surfaces to be equal, that is to say $A_i = A_j$, for neighboring electrodes 13, 4; 4, 5; 5, 6 to have different thicknesses $d_i \neq d_{i+1}$, and for electrodes 13, 5; 4, 6 which are neighboring in a next but one fashion to have thicknesses $d_i \neq d_{i+2}$ equal to that of the cover 7.

In principle, an insulating pollutant film 14 could also be established by virtue of the fact that the electrode pair capacitance $C_o$ in a conductive medium 10 drops with respect to a preset desired value. However, one advantage of a plurality of independent capacitance measurements with different cover thicknesses $d_i \neq d_j$ consists in that the insulating pollutant film 14 can be detected and measured with high reliability even given a variable or various media 10. In particular, multiplicative changes in measured values drop out from the quotient expressions in equations G8 and G10.

The effective thickness $d_s/\epsilon_s$, determined with the aid of equations G6 or G7, of a dielectric pollutant film 14 can be used in various ways to control and/or correct the liquid level measurement. For example, non-falsified values of the double-layer capacitances and of the total capacitance $C_o$ can be determined by eliminating $d_s/\epsilon_s$, in equations G4–G6 computationally. Moreover, suitable measures can be adopted as soon as $d_s/\epsilon_s$ exceeds a prescribable critical value. These comprise, in particular, regulating the quantity of an inhibitor additive for chemically dissolving the pollutant film 14, required or periodic cleaning of the measuring rod 1 by means of an axially moveable ring, or the like.

Thus, the inventive method for liquid level measurement is defined overall in that covers 7 of different thicknesses $d_i \neq d_j$ are present, and in that an effective thickness $d_s/\epsilon_s$ of an insulating pollutant film 14 is calculated with the aid of capacitance measurements between a plurality of electrodes 4, 5, 6, 13. In particular, a quotient of double-layer capacitances $C_{DSj}$ and $C_{DSi}$ of an i-th and j-th electrode is determined in accordance with formula G10 or G8, and the effective pollutant film thickness $d_s/\epsilon_s$ is calculated in accordance with the formula G6 or G7.

Figure 4:
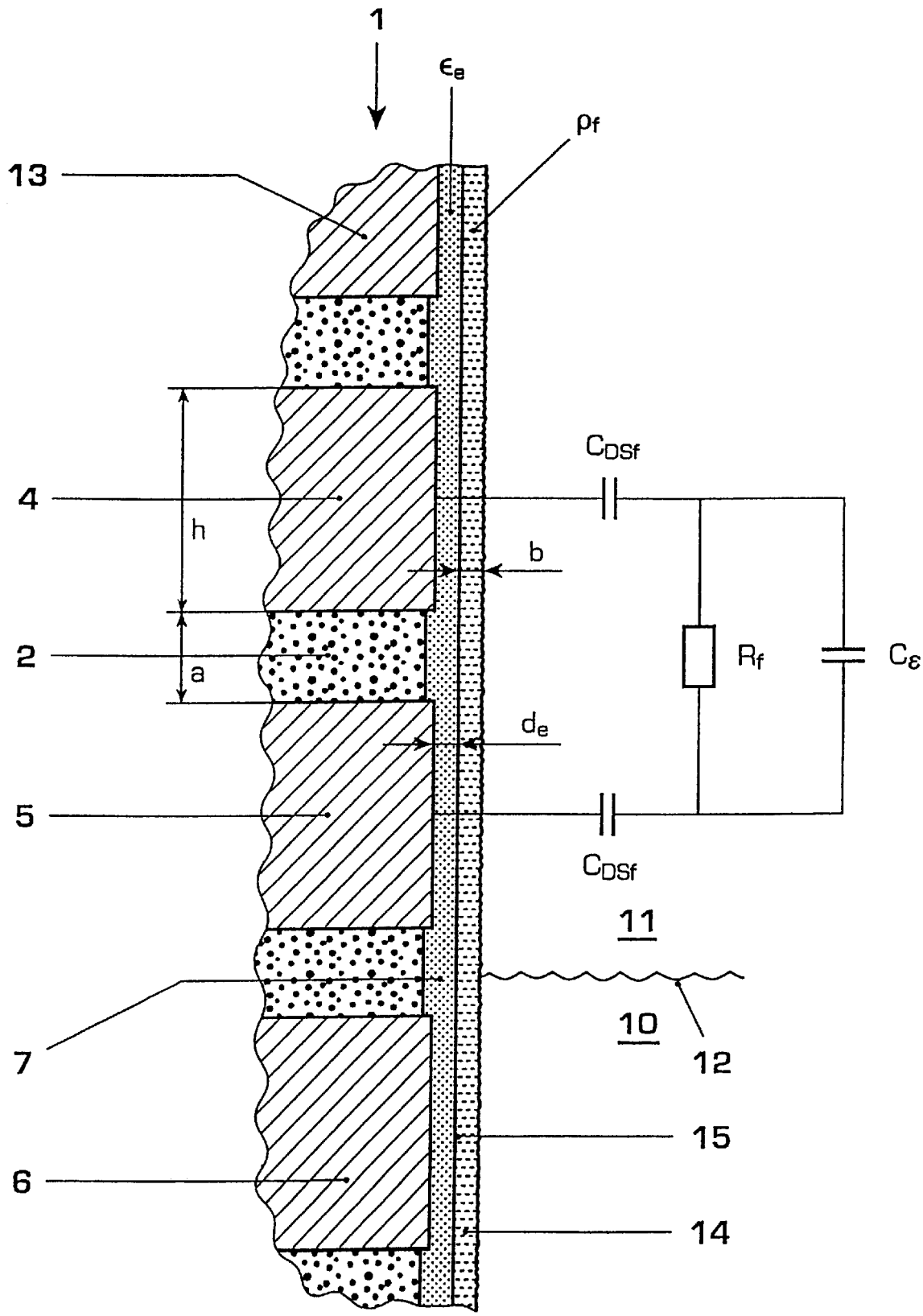
FIG. 4 shows a view of a detail of a measuring probe with a conductive pollutant film, and an associated equivalent circuit diagram for the impedance between an electrode pair.

FIG. 4 shows a detail of a measuring probe 1 which is covered by a more or less conductive pollutant film 14 of thickness b and resistivity $\rho_f$, and dips into an insulating medium 11. For example, the pollutant film 14 can consist of water or a water-oil emulsion. On the one hand, the film 14 contributes with two double-layer capacitances $C_{DSf}$ in accordance with equation G2

$$C_{DSf} = \epsilon_e \cdot \epsilon_0 \cdot 2 \cdot \pi \cdot r \cdot h / d_e \qquad (G11)$$

to the geometrical capacitance $C_\epsilon$ in medium 11, an annular electrode having been assumed for the sake of simplicity. On the other hand, the film 14 acts as an electric conductor in parallel with $C_\epsilon$ with the resistance $$R_f = h_f \cdot \rho_f / (2 \cdot r \cdot b), \qquad (G12)$$

$h_f$ denoting an effective length of the current path in the conductive pollutant film 14 between two electrodes 4, 5. $h_f$ can be set equal to a +h/2 or equal to h by way of approximation. The characteristic RC time constant of the film 14

$$\tau_f = R_f \cdot C_{DSf} / 2 = \tau_{f0} \cdot G \qquad (G13)$$

is composed of a material-specific time constant $$\tau_{f0} = \epsilon_e \cdot \epsilon_0 \cdot \rho_f \qquad (G14)$$

and a geometry factor $$G = h \cdot h_f / (2 \cdot d_e \cdot b) \approx h^2 / (2 \cdot d_e \cdot b). \qquad (G15)$$

The relaxation time $\tau_f$ defines a characteristic frequency of the pollutant film 14

$$f(b) = \tau_f^{-1} = 2 \cdot (\epsilon_e \cdot \epsilon_0 \cdot \rho_f)^{-1} \cdot (d_e / h^2) \cdot b, \qquad (G16)$$

which depends, in particular, on the thickness b of the conductive pollutant film 14. Below or above the characteristic frequency f(b), the total electrode pair capacitance asympototically assumes the values $$C(f) = C_{DSf}/2 \text{ for } f << f(b)$$

$$= C_\epsilon \text{ for } f >> f(b). \qquad (G17)$$

For low frequencies f<<f(b), the pollutant film 14 can simulate a conductive medium 10, although an insulating medium 11 is concealed behind the film 14. For high frequencies f>>f(b), by contrast, the pollutant film 14 appears dielectrically transparent. Consequently, the measuring frequency f is advantageously chosen to be higher than f(b). A quantitative example in this regard: $\rho_f \approx 0.25$ Ωm (brine pollutant film 14), $\epsilon_e \approx 3$, $\tau_{f0} \approx 7$ ps; h≈$h_f$≈15 mm, $d_e$=0.5 mm, b =1 mm, geometry factor G≈200→f(b)=100 MHz. Note that the conductivity of the water varies strongly with the temperature-dependent and pressure-dependent salt content, something which can be taken into account by a suitable frequency selection. If the pollutant film 14 consists of an emulsion of brine of concentration c and oil of concentration 1−c, the approximation $\rho_f \approx \rho_{brine}^c \cdot \rho_{oil}^{1-c}$ can be made, and the characteristic frequency f(b) drops correspondingly. For an arbitrary medium 10 of concentration c and medium 11 of concentration 1−c, it is possible to set $\rho_f \approx \rho_1^c \cdot \rho_2^{1-c}$.

Two exemplary embodiments are specified below of how it is possible to carry out the liquid level measurement in a simple way in the case of a variable film thickness b. Firstly, it is possible to prescribe a maximum permissible film thickness $b_c$ and an associated critical frequency $f_c$, and to select a measuring frequency above $f_c$ $$f > f_c = f(b_c) = 2 \cdot (\epsilon_e \cdot \epsilon_0 \cdot \rho_f)^{-1} \cdot (d_e / h^2) \cdot b_c. \qquad (G18)$$

It is then possible to ensure observance of a film thickness b<$b_c$ by virtue of the fact, for example, that appropriate cleaning intervals are fixed in conjunction with an approximately known rate of pollution. Secondly, it is possible to prescribe a maximum permissible film thickness $b_c$ and an associated critical frequency $f_c$, as well as to select two measuring frequencies below or above $f_c$ $$f_a < f_c = f(b_c) \text{ and } f_b > f_c = f(b_c). \qquad (G19)$$

When the current film thickness b approaches the critical value $b_c$, the capacitance value $C(f_a)$ measured at a lower frequency will then firstly drop, and the capacitance value $C(f_b)$ measured at a higher frequency will remain constant. With the aid of such a signal signature, it is possible in turn to arrange for suitable measures to be taken, for example the addition of an inhibitor or cleaning of the measuring rod 1.

One advantage of monitoring the pollutant film thicknesses $d_s/\epsilon_s$ and $b_c$ consists in the enhanced reliability of the liquid level measurement, with the result that operation free from maintenance is possible over lengthy periods even given contaminating media 10, 11. It is, moreover, very advantageous that the measures for detecting insulating and conductive pollutant films 14 are compatible with one another without difficulty.

A further subject matter of the invention is to specify those electrode arrangements for which the electrode pair capacitance $C_o$ for a conductive medium 10 is as large as possible and $C_\epsilon$ for an insulating medium 11 is as small as possible. For the quantitative analysis, it is assumed for the sake of simplicity that in the rolled-on state the electrodes 4, 5, 6, 13 have a rectangular shape of height h and length $2 \cdot \pi \cdot (r-d_f)$ and that, therefore, because of $d_e << r$ the capacitor surface A=2·ρ·r·h, it being the case that r=radius of the probe 1. The electrode spacing a between the upper edge of a lower electrode 4, 5, 6 and the lower edge of an upper electrode 13, 4, 5 is measured in accordance with FIG. 2.

Figure 5:
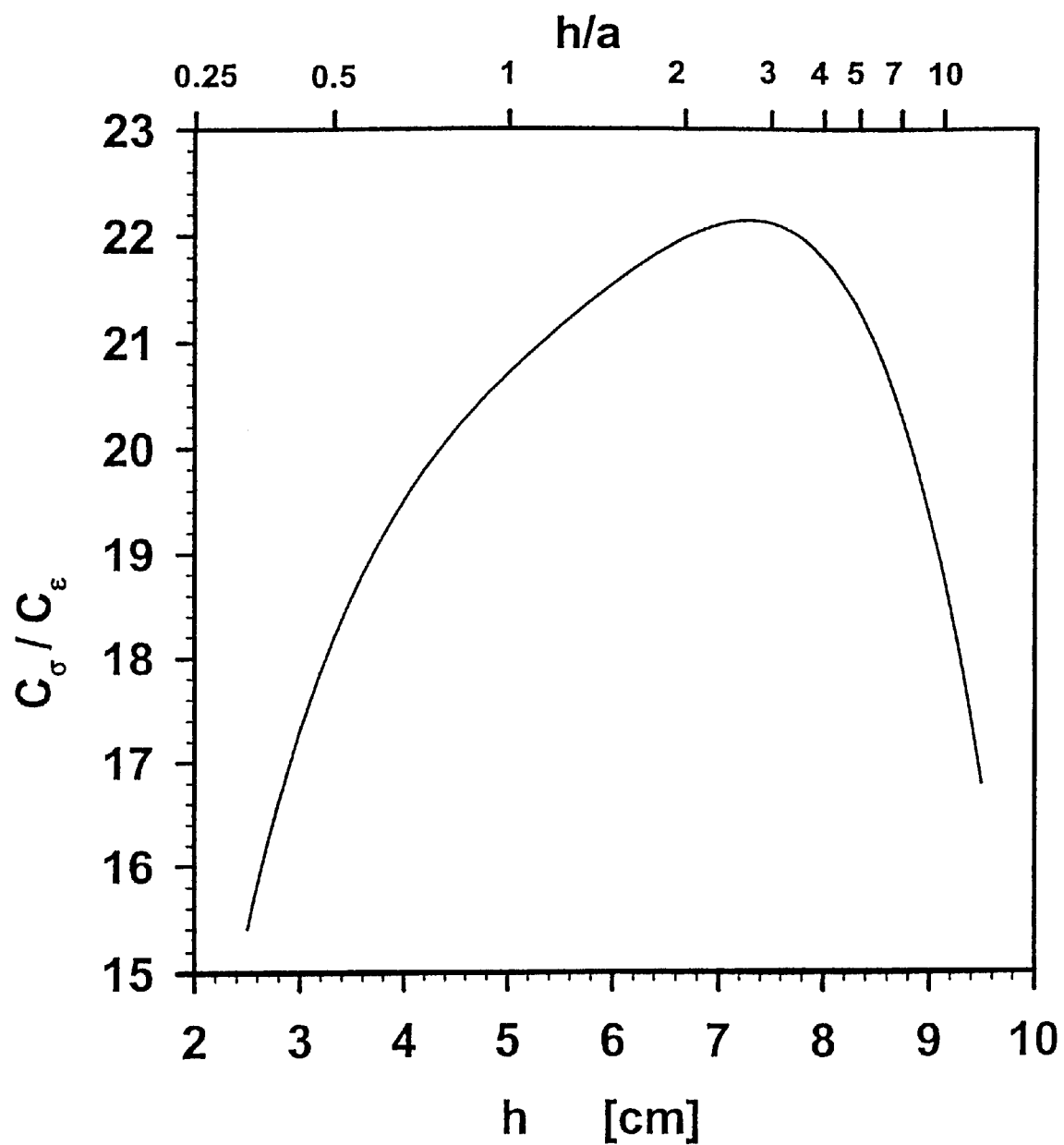
FIG. 5 shows an electrode pair capacitance ratio $C_O/C_\epsilon$ for a conductive medium relative to an insulating one, as a function of the electrode height h for a measuring probe in accordance with FIG. 2.

FIG. 5 shows the result of a numerical simulation of the capacitance ratio $C_o/C_\epsilon$ as a function of electrode height h and the ratio of electrode height to electrode spacing h/a. The following assumptions were made for the calculation: probe radius r=5 cm, constant periodicity of electrode arrangement a+h=10 cm, brine as medium 10 with $\epsilon_1$=64 and $\rho_1$=0.25 Ωm for determining $C_o$, oil as medium 11 with $\epsilon_2$=2.2 and $\rho_2$=$10^{11}$ Ωm for determining $C_\epsilon$ and $\epsilon_e \approx \epsilon_2$. By contrast with the previous interpretation, the capacitance ratio $C_o/C_\epsilon$ for small electrode heights h and large electrode spacings a is small, although it is true that the electric stray field for large a should project further into the media 10, 11 and react with particular sensitivity to changes in the dielectric constants. Instead of this, $C_o/C_\epsilon$ rises with increasing electrode height h, reaches a maximum at around h=7.5 cm or h/a=3, and thereafter drops steeply for h→10 cm. The rise is dominated by the increase of the electrode or capacitor surface A of the double-layer capacitance $C_{DS}$ in $C_o$, whereas the drop is dominated by the increase in $C_\epsilon$ owing to the decreasing electrode spacing a→0. In this exemplary embodiment, $C_o/C_\epsilon$=20.7 for a symmetric arrangement with an electrode height equal to the electrode spacing, or h/a=1. In particular, $C_o/C_\epsilon$>20.7 for 1<h/a<6, and $C_o/C_\epsilon$=22.2 ($C_o$=378 pF, $C_\epsilon$=17 pF) is a maximum for h/a=3. Consequently, h/a for a sufficiently large signal switch $2 \cdot C_o/C_\epsilon$, h/a is advantageously selected between 0.5 and 12, preferably between 1 and 6, and with particular preference between 1.5 and 4.5, in particular equal to 3.

Figure 6:
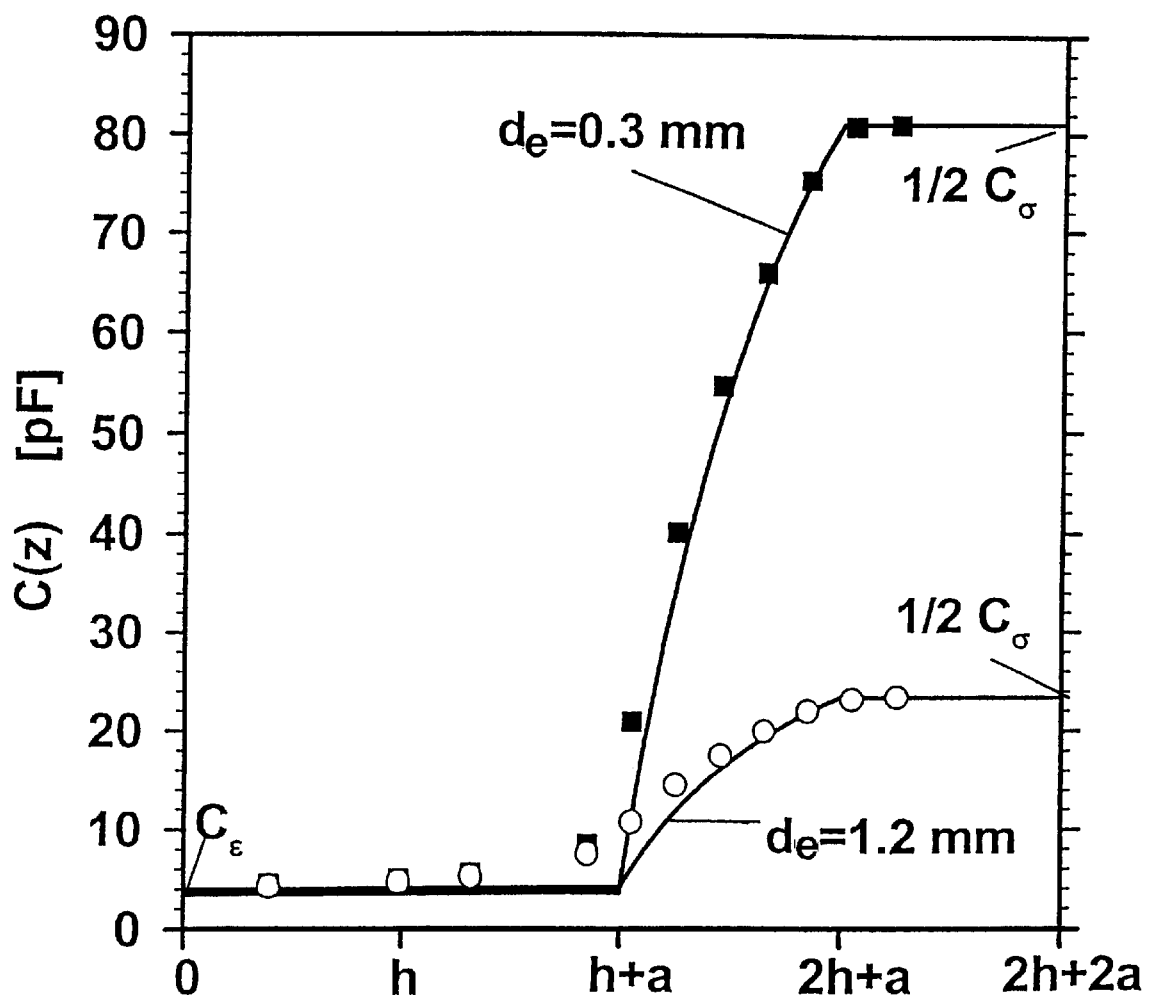
FIG. 6 shows an electrode pair capacitance C as a function of a liquid level height z for two thicknesses $d_e$ of electrode cover for a measuring probe in accordance with FIG. 2.

Apart from the selection of a relative electrode height h/a, the inventive optimization of electrode geometry here also comprises that of an absolute electrode height h, as well as of a maximum thickness $d_e$ and a dielectric constant $\epsilon_c$ of the electrode cover 7. In FIG. 6, the continuous lines show analytical calculations, and the points show numerical calculations of the electrode pair capacitance C as a function of the liquid level height z for two thicknesses $d_e$=0.3 mm and $d_e$=1.2 mm of the electrode cover 7. The analytical function C(z) can be approximated according to the invention by the equation $$C(z) = C_\epsilon \quad \text{for } 0 \le z \le h + a \quad \text{(G20)}$$
$$= C_\epsilon + C_{\sigma} \cdot z/(z+h) \quad \text{for } h + a \le z \le 2 \cdot h + a$$
$$= C_{\sigma}/2 \quad \text{for } 2 \cdot h + a \le z \le 2 \cdot (h+a),$$

it having been assumed for the sake of simplicity that $C_\epsilon \ll C_O$. According to FIG. 6 and equation G20, it is possible to apply the measurement of the electrode pair capacitance C(z) both for a digital and for an analog display of the location z of the interface 12.

The digital display will be discussed firstly, with the aid of the electrode pair 4, 5 in FIG. 2. Capacitance C(z) is largely constant for 0<z <h+a. It jumps from $C_\epsilon$ to the value of $C_O/2$ when the interface 12 rises from z=h+a to z=2•h+a, and maintains the essentially constant value of $C_O/2$ between z=2 •h+a and z=2•(h+a). This clearly means that for z<0 there is a purely geometric capacitance $C_\epsilon$ in a dielectric 11, and for z>2•h+a there are two double-layer capacitances $C_{DS}$ at the electrodes 5 and 4, which are fully immersed in the conductive medium 10. The numerical solution shows that C(z) rises slightly between 0 and h+a, and that the rise of C(z) increases continuously in the region of z=h+a. Both solutions show that the preferred measuring range is in the region of the large rising capacitance between h+a and 2•h+a. Consequently, for an optimum sensor operation it will be preferred to evaluate that electrode pair capacitance C(z) for which the lower electrode is fully immersed in the conductive medium 10 and the upper electrode dips partially therein.

One advantage of the digital display is that, depending on the required signal-to-noise ratio and the type of media 10, 11, the signal swing 2•$C_O/C_\epsilon$ can be adapted, and in particular optimized, by a suitable selection of the relative electrode height h/a in accordance with FIG. 5. A further advantage consists in that it is possible to achieve an adequate and reliable height resolution h+a≈5 cm to 10 cm for separator tanks by selecting the period length h+a of the electrode arrangement 4, 5, 6, 13 appropriately.

A very fine height resolution can, moreover, be realized with an analog display. For this purpose, it is possible to determine a liquid level height z of the interface 12 from the analog measuring signal C(z) in the range of h+a≦z≦2•h+a (or 2•h+2•a ≦z≦3•h+2•a, etc.) by using equation G20. The measuring range h+a≦z≦2•h+a useful for a given electrode pair 5, 4 is defined by the fact that the interface 12 just passes over the electrode 4 and varies the dominant double-layer capacitance $C_{DS}$. By contrast, a dead range h≦z≦h+a exists between electrodes 5, 4. Consequently, for a liquid level sensor operated in an analog fashion, the absolute electrode height h is to be selected to be as large as possible, and the relative electrode height h/a is to be selected in a region with an adequately large signal swing of 2•$C_O/C_\epsilon$ in accordance with FIG. 5. This means that according to the invention h/a is selected to be greater than 1, and preferably less than 12. One advantage of the invention thus consists in that the measuring probe 1, in particular the relative electrode height h/a, can simultaneously be optimized for a digital and analog display.

It is also possible to realize a continuous analog measuring range by means of two independent measuring probes 1, arranged in a mutually offset fashion, with overlapping or at least complementary measuring ranges. In the simplest case, the probes 1 are identical and in turn have a ratio of electrode height to electrode spacing h/a of greater than 1.

It is further to be seen from FIG. 6 and equations G1 and G2 that the electrode cover 7 is to be as thin as possible in order to obtain a large double-layer capacitance $C_{DS}$ and a large signal swing 2•$C_O/C_\epsilon$. It is advantageous for the thicknesses $d_i$ of the covers 7 to be less than a maximum value $d_e$ of 2.5 mm, preferably less than 1.5 mm, and in particular less than 1 mm. The cover 7 acts as a dielectric shield for the E field in the exterior, and thereby prevents the formation of a double-layer capacitance $C_{DS}$. The cover 7 advantageously has a dielectric constant $\epsilon_e$ of less than 10 and, in particular, less than 5.

The above considerations relate to an interface 12 between an ion conductor, electrolyte 10 and an insulator 11. In the calculations, the frequency f of the capacitance measurement was set equal to zero. However, the results remain valid when the capacitance measurement is carried out with an AC voltage of frequency $$f < \tau_1^{-1} \approx (K \cdot \epsilon_1 \cdot \epsilon_0 \cdot \rho_1)^{-1} = f_1 \quad \text{(G21)}$$

instead of with DC voltage. The cut-off frequency $f_1$ of the dielectric relaxation is typically 1 GHz for brine.

The inventive electrode optimization likewise remains valid when an interface 12 is to be located between two conductive media 10, 11 with very different resistivities $\rho_1 \ll \rho_2$. In accordance with equation G21, the media 10, 11 separated by the interface 12 then have different dielectric cut-off frequencies $f_1 = (K \cdot \epsilon_e \cdot \epsilon_0 \cdot \rho_1)^{-1}$ and $f_2 = (K \cdot \epsilon_e \cdot \epsilon_0 \cdot \rho_2)^{-1}$, and the frequency of the capacitance measurement or measuring frequency f can be selected to be between the cut-off frequencies $f_2$ and $f_1$, that is to say in the frequency range $$f_2 \ll f \ll f_1. \quad \text{(G22)}$$

The conductive medium 10 is then capable of forming a double-layer capacitance $C_{DS}$, whereas only the geometric capacitance $C_\epsilon$ is effective in the less conductive medium 11. It holds for oil that $f_2 \ll 1$ Hz.

Moreover, the electrode optimization and the selection of a measuring frequency in accordance with equation G21 or G22 is very compatible with the selection of the measuring frequency(s) according to equation G18 or G19 for eliminating a conductive pollutant film 14 for measurement purposes. Specifically, in general terms a critical frequency $f_c$ is given or can be selected for the media 10, 11 and a pollutant film 14 in such a way that $f_2 < f_c < f_1$ is satisfied. In particular, it holds virtually always that $$f_c/f_1 = (\rho_1/\rho_f) \cdot G^{-1} < 1, \quad \text{(G23)}$$

since it is typically the case that $\rho_1 \le \rho_f$ and $G^{-1}(2 \cdot d_e \cdot b)/h^2 \approx 10^{-2} \ldots 10^{-3}$. A measuring frequency can then be selected in the frequency range of $f_c < f < f_1$, for which the pollutant film 14, but not the conductive medium 10 is transparent. In addition, the electrode height h is advantageously selected to be large and the thickness $d_e$ of the cover 7 to be small, entirely in agreement with the inventive electrode optimization, in order to render the geometry factor G as large as possible and the critical frequency $f_c$ of the pollutant film 14 as low as possible.

Finally, optimizing the electrode height h is also compatible with the variation in the cover thickness $d_i$ and, in particular, with a radial offset of the electrodes 4, 5, 6, 13 for detecting an insulating pollutant film 14. Again, the electrodes 4, 5, 6, 13 can be selected without difficulty to be of vertical orientation and large area, as a result of which the capacitance ratio $C_o/C_\epsilon$ becomes particularly large. In addition, there are in general no restrictions with respect to the cross section of the probe 1. Geometric variables such as, for example, the electrode height h, the capacitor surfaces $A_i$, the thicknesses $d_i$ of the cover 7 or the film thicknesses b, $b_c$ and $d_s$ are to be replaced, if appropriate, by average or root-mean-square values. In particular, the shape of electrodes 4, 5, 6, 13 is not restricted to the rectangular one mentioned. In the rolled-on state, the electrodes 4, 5, 6, 13 may also be in the shape of a trapeze, triangle, or the like.

The tube 2 consists of a dielectric such as plastic, plexiglass, PVC, glass, ceramic or the like. The tube interior 3 with the measuring lines 8 and sheaths 9 is advantageously sealed with an epoxy resin. This ensures stable basic capacitances and renders the probe 1 resistant to high pressure. The electrode cover 7 consists, for example, of a castable coating of epoxy resin or of glass, a ceramic, mica or similar, and is, in particular, fiber reinforced. The electrode cover 7 preferably comprises a stable glass fiber sheath with a thickness of only approx. 0.5 mm ... 1 mm, which is covered with epoxy resin. For the purpose of good mechanical thermosolidity of the probe 1, it is preferred to use materials with similar coefficients of thermal expansion. Overall, the invention discloses a capacitive measuring probe 1 which is very well suited to accurate liquid level measurement in the presence of any sort of pollutant films 14.

LIST OF DESIGNATIONS

1 Capacitive measuring probe, measuring rod
2 Tube
2b Lateral surface
3 Tube interior
5,6,13 Electrodes
5a, 5b Segmented electrodes
7 Electrode cover
8 Measuring lines
9 Sheath
10 Water, conductive medium, medium with dielectric relaxation time $\tau_1$
11 Oil, insulating medium, medium with dielectric relaxation time $\tau_2$
12 Interface
14 Pollutant film
15 Surface of the measuring probe
a Electrode spacing
h Electrode height
$d_e$, $d_1$, $d_2$, $d_j$, $d_{j+1}$, $d_{j+2}$ Thickness of the electrode cover
$d_s$ Thickness of a dielectric pollutant film
$b_c$ Thickness of a conductive pollutant film
f Frequency of the capacitance measurement
$f_1$, $f_2$ Cut-off frequencies of the dielectric relaxation of the media 10, 11
$f_c$ Cut-off frequency of the dielectric relaxation of the pollutant film
r Radius of the measuring probe
z Liquid level height, spatial coordinates of an interface
Δ Measuring inaccuracy
$\epsilon_0$ Absolute permittivity
$\epsilon_M$ Dielectric constant of a medium
$\epsilon_e$ Dielectric constant of the electrode cover
$\epsilon_s$ Dielectric constant of the pollutant film
$\rho_f$ Resistivity of the pollutant film
$\rho_M$ Resistivity of a medium
$\tau$, $\tau_1$, $\tau_2$ Dielectric relaxation time constants of a medium
$\tau_f$, $\tau_{f0}$ Dielectric relaxation time constant of the pollutant film
ω Angular frequency of the capacitance measurement
A, $A_j$, $A_{j+1}$ Double-layer capacitor surfaces
B Probe axis
$C_{DS}$, $C_{DS1}$, $C_{DS2}$ Double-layer capacitances
$C_{DSf}$ Double-layer capacitance of a conductive pollutant film
$C_\epsilon$ Electrode pair capacitance for an insulating medium
$C_o$, $C_{oS}$ Electrode pair capacitance for a conductive medium
C(z), C Total capacitance, electrode pair capacitance
G Geometry factor
R, $R_{ij}$, $R_{jk}$, $R_{ik}$ Resistances in the conductive medium

What is claimed as new and desired to be secured by Letters Patent of the United States is:

1. A method for liquid level measurement with a liquid level measurement device, the liquid level measurement device including electrodes which are arranged along an axis of a rod-shaped probe and which are provided with corresponding electrically insulating covers, wherein at least two of the electrically insulating covers have thicknesses different from each other, the method for determining the effective thickness of the insulating pollutant comprising the steps of:

determining an effective thickness of an insulating pollutant film on the liquid level measurement device by measuring capacitances between the electrodes; and
   calculating an effective thickness ($d_s/\epsilon_s$) of the insulating pollutant film based on the measured capacitances, where $d_s$ is a geometric thickness of the pollutant film and $\epsilon_s$ is a dielectric constant of the pollutant film.

2. The method of claim 1, wherein
   a) a quotient of double-layer capacitances $C_{DSi}$ and $C_{DSj}$ of i-th and j-th ones of the electrodes is determined in accordance with the formula $$C_{DSj}/C_{DSi}=(C_{oij}^{-1}+C_{oik}^{-1}-C_{ojk}^{-1})/(C_{oij}^{-1}+C_{ojk}^{-1}-C_{oik}^{-1}),$$

where $C_{oij}$, $C_{oik}$, $C_{ojk}$ denote total capacitances which are measured between the i-th and j-th, the j-th and a k-th one of the electrodes, and the i-th and k-th electrodes respectively, and b) the effective thickness ($d_s/\epsilon_s$) is calculated in accordance with the formula $$d_s/\varepsilon_s = (d_i/\varepsilon_e)\cdot((C_{DSj}\cdot d_j\cdot A_i)/(C_{DSi}\cdot d_i\cdot A_j)-1)/(1-C_{DSj}\cdot A_i/C_{DSi}\cdot A_j),$$

where $\epsilon_e$=dielectric constant of the electrically insulating covers, $d_i$, $d_j$=thicknesses of ones of the electrically insulating covers corresponding to the i-th and j-th electrodes, and $A_i$, $A_j$=capacitor surfaces of the i-th, j-th electrodes respectively.

3. The method of claim 1, where
   a) adjacent ones of the electrodes are of different thickness, and alternate ones of the electrodes are of the same thickness as corresponding ones of the electrically insulating covers,
   b) a quotient of double-layer capacitances $C_{DSi}$ and $C_{DSj}$ of i-th and j-th ones of the electrodes is determined in accordance with the formula $$C_{DSj}/C_{DSi}=C_{oj}/C_{oi},$$

where $C_{oj}$, $C_{oi}$ denote total capacitances which are measured between alternate ones of the electrodes, c) the electrodes have the same capacitor surfaces, and d) the effective thickness ($d_s/\epsilon_s$) of the insulating pollutant film is calculated in accordance with the formula $$d_s/\varepsilon_s = (d_i/\varepsilon_e) \cdot ((C_{DSj} \cdot d_j)/(C_{DSi} \cdot d_i) - 1)/(1 - C_{DSj}/C_{DSi}),$$

where $\epsilon_e$=dielectric constant of the electrically insulating covers and $d_i$, $d_j$=thicknesses of the ones of the electrically insulating covers corresponding to the i-th, j-th electrodes.

4. A capacitive liquid level sensor for measuring a liquid level by determining an effective thickness of an insulating pollutant film, comprising:

a rod-shaped probe;

a plurality of electrodes which are arranged along an axis of the probe;

electrically insulating covers corresponding to the electrodes; and electronic measuring system connected to the plurality of electrodes; wherein at least two of the electrically insulating covers are of different thicknesses, and the electronic measuring system comprises means for measuring capacitance between ones of the plurality of electrodes and for determining a quotient of double-layer capacitances $C_{DSi}$ and $C_{DSj}$ of i-th and j-th ones of the plurality of electrodes, and for calculating an effective thickness ($d_s/\epsilon_s$) of the insulating pollutant film where $d_s$ is a geometric thickness of the pollutant film and $\epsilon_s$ is a dielectric constant of the pollutant film.

5. The capacitive liquid level sensor as claimed in claim 4, wherein a) adjacent ones of the plurality of electrodes are of different thickness, and alternate ones of the plurality of electrodes are of the same thickness as corresponding ones of the electrically insulating covers, and b) the electrodes have equal capacitor surfaces.

6. The capacitive liquid level sensor as claimed in claim 4, wherein a) the thicknesses of the electrically insulating covers are smaller than a maximum value ($d_e$) of 2.5 millimeters, and b) the electrically insulating covers have a dielectric constant ($\epsilon_e$) of less than 10.

7. The capacitive liquid level sensor as claimed in claim 4, wherein a) a pollutant film of resistivity $\rho_f$ is prescribed a maximum permissible thickness $b_c$ and an associated critical frequency $f_c = 2 \cdot (\epsilon_e \cdot \epsilon_0 \cdot \rho_f)^{-1} \cdot (d_e/h^2) \cdot b_c$, where h=electrode height extending along the probe axis, $\epsilon_0$=absolute permittivity, $d_e$=a maximum thickness of the electrically insulating covers, and b) a first measuring frequency $f_b > f_c$ is selected.

8. The capacitive liquid level sensor as claimed in claim 4, wherein the sensor is a sensor for determining a location of an interface between different media in a separator tank, the media separated by the interface have different cut-off frequencies corresponding to respective dielectric relaxations of the media, and at least one measuring frequency is selected in a frequency range bounded by the cut-off frequencies of the media.

9. The capacitive liquid level sensor as claimed in claim 4, wherein a) a ratio of a height of at least one of the plurality of electrodes along the probe axis to a spacing between adjacent ones of the plurality of electrodes is selected which is greater than 1, and b) the liquid level sensor is equipped for an analog and/or digital display.

10. The capacitive liquid level sensor as claimed in claim 4, wherein a) the probe comprises a cylindrical tube to whose lateral surface the plurality of electrodes is applied, and b) the tube interior is sealed against the exterior surrounding the probe.

11. The capacitive liquid level sensor as claimed in claim 10, wherein a) the tube consists of a dielectric that is at least one of plastic, glass and ceramic, and b) the electrically insulating covers consist of at least one of epoxy resin, glass, ceramic, mica and reinforcing fibers.

12. The capacitive liquid level sensor of claim 6, wherein the thicknesses of the electrically insulating covers are smaller than 1.5 millimeters.

13. The capacitive liquid level sensor of claim 6, wherein the thicknesses of the electrically insulating covers are smaller than 1.0 millimeters.

14. The capacitive liquid level sensor of claim 6, wherein the electrically insulating covers have a dielectric constant ($\epsilon_e$) of less than 5.

15. The capacitive liquid level sensor of claim 7, wherein a second measuring frequency $f_a < f_c$ is selected.

16. The capacitive liquid level sensor of claim 9, wherein the selected ratio is less than 6.

17. The capacitive liquid level sensor of claim 9, wherein the selected ratio is between 1.5 and 4.5.

18. The capacitive liquid level sensor of claim 9, wherein the selected ratio is 3.

19. The capacitive liquid level sensor of claim 10, wherein:

the cylindrical tube is circular;

the plurality of electrodes is annular and/or segmented; and each of the plurality electrodes has a rectangular cross-section.

20. The method of claim 1, wherein the liquid level measurement device is configured for determining a location of an interface between different media.

21. The method of claim 1, wherein the media comprise water and oil.

* * * * *

UNITED STATES PATENT AND TRADEMARK OFFICE
CERTIFICATE OF CORRECTION

PATENT NO. : 6,073,488
DATED : June 13, 2000
INVENTOR(S) : Anthony BYATT; Thomas CHRISTEN; Thomas KLEINER; Daniel MATTER, and Walter RÜEGG It is certified that error appears in the above-identified patent and that said Letters Patent is hereby corrected as shown below:

On the Title Page,
Item [75]: Change "Anghony" to -- Anthony --.

Signed and Sealed this

Twenty-seventh Day of March, 2001

Attest:

NICHOLAS P. GODICI

Attesting Officer

Acting Director of the United States Patent and Trademark Office